(12) United States Patent
Friend et al.

(10) Patent No.: US 10,567,071 B1
(45) Date of Patent: Feb. 18, 2020

(54) GROUND-BASED ANTENNA FOR CONCURRENT COMMUNICATIONS WITH MULTIPLE SPACECRAFT

(71) Applicant: THE BOEING COMPANY, Chicago, IL (US)

(72) Inventors: Robert Bruce Friend, Redondo Beach, CA (US); Kurt William Loheit, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/125,012

(22) Filed: Sep. 7, 2018

(51) Int. Cl.
    H04B 7/185 (2006.01)
    H04B 7/19 (2006.01)
    H01Q 21/24 (2006.01)
    H04B 7/195 (2006.01)
    H01Q 1/24 (2006.01)

(52) U.S. Cl.
    CPC ......... H04B 7/18517 (2013.01); H01Q 21/24 (2013.01); H04B 7/19 (2013.01); H04B 7/195 (2013.01); H01Q 1/24 (2013.01)

(58) Field of Classification Search
    CPC ...... H04B 7/18517; H04B 7/195; H04B 7/19; H01Q 21/24; H01Q 1/24
    See application file for complete search history.

(56) References Cited

U.S. PATENT DOCUMENTS

| 6,034,634 A * | 3/2000 | Karlsson | H01Q 3/08 342/359 |
| 6,593,893 B2 | 7/2003 | Hou et al. | |
| 2002/0081969 A1* | 6/2002 | Chang | H01Q 1/007 455/13.1 |
| 2005/0052333 A1* | 3/2005 | Rao | H01Q 19/17 343/840 |
| 2010/0238082 A1 | 9/2010 | Van Heyningen et al. | |
| 2015/0304019 A1 | 10/2015 | Shreve et al. | |
| 2016/0233942 A1 | 8/2016 | Ling | |

OTHER PUBLICATIONS

Extended European Search Report dated Dec. 3, 2019 issued in corresponding EP Application No. 19191171, 9 pgs.

\* cited by examiner

*Primary Examiner* — Dong-Chang Shiue
(74) *Attorney, Agent, or Firm* — Moore Intellectual Property Law, PLLC (57) ABSTRACT

A system includes an antenna of a ground station. The antenna is configured to generate a plurality of signal beams. The plurality of signal beams defines a plurality of cells in the sky. The antenna is mechanically fixed to a particular orientation. The antenna includes a phased array antenna. The system also includes a processor coupled to the antenna. The processor is configured to initiate concurrent communications with a plurality of spacecraft via the plurality of signal beams. The plurality of spacecraft is located within the plurality of cells.

17 Claims, 4 Drawing Sheets

GROUND-BASED ANTENNA FOR CONCURRENT COMMUNICATIONS WITH MULTIPLE SPACECRAFT

FIELD OF THE DISCLOSURE

The present disclosure is generally related to an antenna for communicating with spacecraft.

BACKGROUND

As technology improves, wireless communications, such as cellular communications, have become more and more ubiquitous. Some cellular networks include one or more satellites for providing cellular communications to mobile devices, such as satellite phones. In such systems, a satellite is capable of transmitting and receiving data from multiple electronic devices and routing the received data to a ground station for further processing. To enable such communications, satellites typically include large antennas that provide multiple communication beams to form a coverage area on the Earth. Electronic devices within the coverage area communicate with the satellites via the multiple beams. The satellites also include additional antennas to enable communications with the ground station. The antennas on-board the satellites represent a significant portion of the overall size, weight, and power consumption of the satellites, and thus represent challenges in decreasing the overall cost, weight, size, and power consumption of the satellites.

To perform communications with multiple satellites, the ground station includes multiple antennas. Using multiple antennas at a ground station increases cost and complexity of the system. Additionally, to perform communication with satellites as they traverse respective orbital paths, the antennas at the ground station are mechanically steered to follow the orbital paths of the satellites. For example, a ground-based antenna includes gimbals, motors, and other components that mechanically steer the antenna (e.g., that change an orientation of the antenna, a position of the antenna, or both) to track a satellite as the satellite moves across the sky. These mechanical steering components increase cost and complexity of the ground-based antennas.

Another challenge facing satellite systems is identification of the various satellites at the ground station. One way to identify satellites is to have each satellite include identification information in each transmission to the ground station. Including identification information in each transmission to the ground station increases network congestion and decreases throughput in the satellite system.

SUMMARY

In a particular implementation, a system includes an antenna of a ground station. The antenna is configured to generate a plurality of signal beams. The plurality of signal beams defines a plurality of cells in the sky. The antenna is mechanically fixed to a particular orientation. The antenna includes a phased array antenna. The system also includes a processor coupled to the antenna. The processor is configured to initiate concurrent communications with a plurality of spacecraft via the plurality of signal beams. The plurality of spacecraft is located within the plurality of cells.

In another particular implementation, a method includes generating a plurality of signal beams at an antenna of a ground station. The plurality of signal beams defines a plurality of cells in the sky. The antenna is mechanically fixed to a particular orientation. The antenna includes a phased array antenna. The method also includes performing concurrent communications with a plurality of spacecraft via the plurality of signal beams. The plurality of spacecraft is located within the plurality of cells.

In another particular implementation, a computer-readable storage device stores instructions that, when executed by a processor, cause the processor to perform operations including initiating generation of a plurality of signal beams at an antenna of a ground station. The plurality of signal beams defines a plurality of cells in the sky. The antenna is mechanically fixed to a particular orientation. The antenna includes a phased array antenna. The operations also include initiating concurrent communications with a plurality of spacecraft via the plurality of signal beams. The plurality of spacecraft is located within the plurality of cells.

DETAILED DESCRIPTION

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, it will be understood that the term "wherein" is be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless content indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. Additionally, "adjusting" and "modifying" can be used interchangeably. For example, "adjusting" or "modifying" a parameter can refer to changing the parameter from a first value to a second value (a "modified value" or an "adjusted value"). As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Disclosed herein are implementations of systems and methods for enabling a single ground-based antenna to concurrently communicate with multiple spacecraft. According to one aspect, the antenna includes a phased array antenna that is configured to generate a plurality of signal beams that define a plurality of cells in the sky. The plurality of signal beams enable communication with spacecraft located within the plurality of cells. For example, the antenna is configured to send and receive data from a spacecraft within a particular cell via a particular signal beam that defines the particular cell. Because the antenna is configured to generate a plurality of beams, the antenna is able to communicate with multiple spacecraft concurrently (e.g., portions of communications to multiple spacecraft occur at the same time). Thus, cost and complexity of the system is reduced, as compared to systems that use multiple ground-based antennas to communicate with multiple spacecraft.

The antenna (e.g., the ground-based antenna) is fixed to a particular orientation. For example, the antenna does not include gimbals, motors, or other components to mechanically steer the antenna. Instead, the antenna is configured to communicate with the multiple spacecraft using the plurality of signal beams. The antenna includes a plurality of antenna elements configured to generate the plurality of signal beams. For example, the plurality of antenna elements performs beam forming to generate the plurality of signal beams, as further described herein. The plurality of signal beams defines the plurality of cells (e.g., a coverage area) in the sky in which the antenna is able to perform communications with multiple spacecraft. The size and shape of the cells are controlled by characteristics of the antenna elements, such as beam forming parameters associated with the plurality of antenna elements and other characteristics of the antenna elements, as further described herein. Additionally, the location of the cells is controlled by the orientation of the plurality of antenna elements. In a particular implementation, the antenna (e.g., the plurality of antenna elements) is designed such that the plurality of cells provides horizon-to-horizon coverage. For example, the number of antenna elements, the orientation of the antenna elements, and other characteristics of the antenna elements are selected such that the plurality of cells extends from one horizon to another horizon. Due to the coverage area of the plurality of cells, the antenna is not steered to change an orientation during communication with multiple spacecraft. Therefore, the antenna reduces costs as compared to other ground-based antennas that include mechanical steering components, such as gimbals, motors, and other components.

Because the ground-based antenna is configured to provide the plurality of signal beams that define the plurality of cells, the communication circuitry located on-board the spacecraft is smaller and less complex than communication circuitry located on-board other spacecraft. For example, the spacecraft can include satellites and can include communication circuitry that is typically found in a satellite phone to enable communications with the ground-based antenna. Such communication circuitry typically has dimensions that are less than a few inches due to the small form factor of the satellite phones. Using this communication circuitry on-board the satellites enables design of satellites with much smaller form factors compared to conventional satellites. For example, "CubeSats" having a total volume of a few cubic centimeters or inches can be designed using the smaller communication circuitry. These small satellites may be monitored and controlled by the ground-based antenna, as further described herein.

Additionally, systems and methods described herein enable improved tracking and identification of spacecraft as compared to conventional systems. For example, as the spacecraft traverse the plurality of cells in the sky, the locations of the spacecraft can be determined relative to the plurality of cells as communications are received via the plurality of signal beams. To illustrate, a first location of a spacecraft is determined to be within a particular cell when a communication is received via a signal beam that defines the particular cell. As locations of the spacecraft are determined, an orbital path of the spacecraft is estimated based on the locations. Because the orbital path is estimated based on locations determined with respect to the plurality of cells, the ground-based antenna does not need to be mechanically steered to track a particular spacecraft. Additionally, the estimated orbital path can be compared to orbital path data stored at a memory to identify a matching orbital path. For example, the orbital path data includes registered or otherwise designated orbital paths of a particular group of spacecraft. By matching the estimated orbital path to one of the orbital paths identified by the orbital path data, an identity of the spacecraft is determined. For example, if the estimated orbital path matches the designated orbital path of "Spacecraft A," the spacecraft is identified as Spacecraft A. Thus, the systems and methods described herein describe identification of spacecraft without including identification information in each communication from the spacecraft, which improves overall bandwidth and throughput of the system, or reduces infrastructure included in the spacecraft to otherwise identify the spacecraft.

Figure 1:
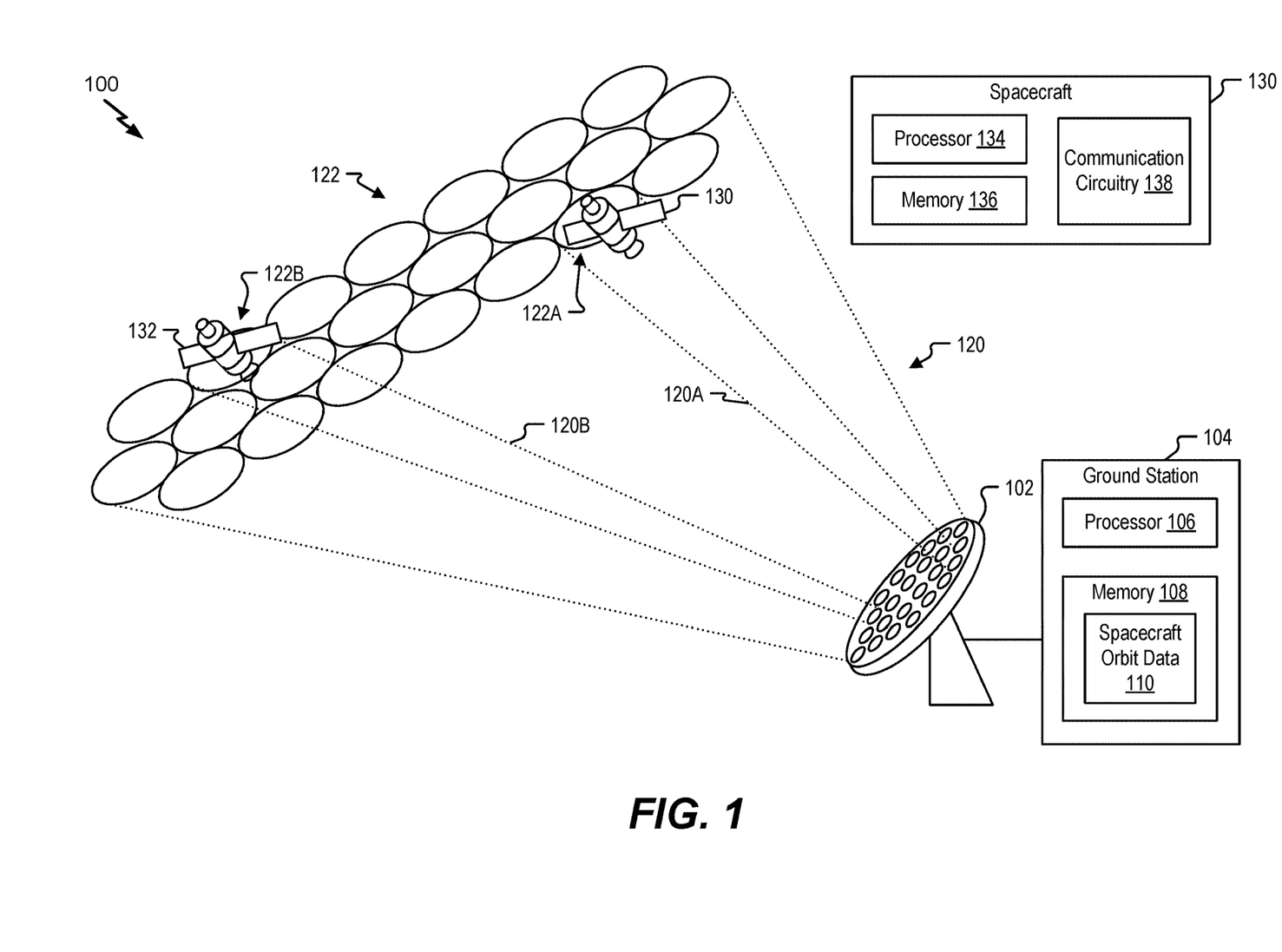
FIG. 1 is a diagram that illustrates a particular implementation of a system for performing concurrent communications with multiple spacecraft.

FIG. 1 illustrates an example of a particular implementation of a system 100 performing concurrent communications with multiple spacecraft. The system 100 includes an antenna 102, a ground station 104, and a plurality of spacecraft including a first spacecraft 130 and a second spacecraft 132. Although two spacecraft are illustrated, in other implementations, the system 100 includes more than two spacecraft.

The antenna 102 and the ground station 104 are located at a particular location on the Earth. The antenna 102 is coupled to the ground station 104. Although illustrated as separate components, the antenna 102 can be part of the ground station 104. The antenna 102 and the ground station 104 are configured to perform concurrent communications with the first spacecraft 130 and the second spacecraft 132, as further described herein. In a particular implementation, the ground station 104 includes a processor 106 and a memory 108. The memory 108 can include a random access memory, a read only memory, a cache or other dynamic memory, a static memory such as a storage device, a different type of computer-readable storage device, or any combination thereof. The memory 108 is configured to store instructions that, when executed by the processor 106, cause the processor 106 to perform the operations described herein. Additionally, the memory 108 is configured to store spacecraft orbit data 110. The spacecraft orbit data 110 indicates the orbital paths of one or more spacecraft that are operated by an operator of the ground station 104 or that are registered with a government agency or other organization. The spacecraft orbit data 110 is used to identify spacecraft detected by the antenna 102, as further described with reference to FIG. 3.

In a particular implementation, the ground station 104 is a base station. In this implementation, the ground station 104 is connected to a circuit-switched network, such as a public switched telephone network (PSTN), a packet switched network, such as the Internet, a private network, other communication services, or a combination thereof. Additionally, or alternatively, the ground station 104 can include an operations center for communication with and controlling a constellation of spacecraft (e.g., multiple spacecraft, such as the first spacecraft 130 and the second spacecraft 132).

In a particular implementation, the antenna 102 is fixed to a particular orientation. For example, the antenna 102 can be oriented at a particular orientation and can be immovable. To illustrate, the antenna 102 does not include gimbals, motors, or other components configured to mechanically steer the antenna 102 (e.g., the antenna 102 does not include components configured to change an orientation or position of the antenna 102). In an alternate implementation, the antenna 102 includes a 1-dimensional gimbal to provide coarse adjustments to an orientation of the antenna 102, thereby adjusting a coverage area provided by the antenna 102.

In particular implementations, the antenna 102 is a phased array antenna. For example, the antenna 102 includes a plurality of antenna elements arranged in an array. Characteristics of the signal beams are based on beam forming parameters, as further described herein. In some implementations, each antenna element of the plurality of antenna elements is fixed to a corresponding orientation.

The antenna 102 is configured to generate a plurality of signal beams 120. The plurality of signal beams 120 can include a plurality of transmit signal beams, a plurality of receive signal beams, or a combination thereof. For example, the plurality of signal beams can include transmit signal beams that enable transmission of data to the first spacecraft 130 and the second spacecraft 132, receive signal beams that enable receipt of data from the first spacecraft 130 and the second spacecraft 132, or a combination thereof.

The plurality of signal beams 120 defines a plurality of cells 122 in the sky. The plurality of cells 122 indicate regions of coverage by a corresponding signal beam of the plurality of signal beams 120. Although each of the plurality of cells 122 is illustrated as an ellipsoid in FIG. 1, such illustration is not limiting. In other implementations, the cells have other shapes, such as circles, squares, rectangles, hexagons (or other polygons), different ellipsoids, or other shapes. In a particular implementation, the shapes of the cells are set based on beam forming parameters and characteristics of the plurality of antenna elements, as further described with reference to FIG. 2. Additionally, although the cells are illustrated as non-overlapping, such illustration is for convenience and is not intended to be limiting. In other implementations, the cells of the plurality of cells 122 are overlapping such that a continuous region of coverage is provided.

In some implementations, adjacent cells of the plurality of cells 122 are associated with different parameters. For example, the plurality of cells 122 can be associated with a reuse pattern such that adjacent cells are not associated with the same parameters. The parameters can include communication times (e.g., for time division multiple access (TDMA) schemes), communication codes (e.g., for code division multiple access (CDMA) schemes), frequency bands (e.g., for frequency division multiple access (FDMA) or orthogonal frequency division multiple access (OFDMA) schemes), other parameters, or a combination thereof. The parameters associated with each cell are based on a wireless protocol used to perform communications within the system 100. The communication protocol can include a TDMA protocol, a CDMA protocol, a FDMA or OFDMA protocol, another type of communication protocol, or a combination thereof.

The coverage area of the plurality of cells 122 is based on the size and shape of the cells. The size and shape of the cells may be set for a particular distance from the antenna 102. For example, the plurality of antenna elements can be designed to generate the plurality of cells 122 with each cell having a particular size at a particular orbit (e.g., height) above the Earth. In a particular implementation, the plurality of antenna elements is configured to provide "horizon-to-horizon" coverage. For example, in some implementations, the plurality of cells 122 extends from one horizon to another, with respect to the location of the antenna 102.

The antenna 102 and the ground station 104 are configured to enable concurrent communications with multiple spacecraft. For example, the processor 106 is configured to initiate concurrent communications with the first spacecraft 130 and the second spacecraft 132 via the plurality of signal beams 120. Concurrent communications refer to communications where at least a portion of the two communications occur at the same time (although other portions can occur at different times). The concurrent communications can include transmission of communication signals, reception of communication signals, or both. The concurrent communications are enabled when the first spacecraft 130 and the second spacecraft 132 are located within the plurality of cells 122.

The first spacecraft 130 and the second spacecraft 132 are configured to traverse respective orbital paths across the plurality of cells 122. The first spacecraft 130 and the second spacecraft 132 are further configured to communicate with the ground station 104 via the antenna 102. In a particular implementation, the first spacecraft 130 and the second spacecraft 132 include satellites. In other implementations, the first spacecraft 130 and the second spacecraft 132 include space shuttles, space stations, rockets, or other types of spacecraft. The first spacecraft 130 includes a processor 134, a memory 136, and communication circuitry 138. The memory 136 may store instructions that, when executed by the processor 134, cause the processor 134 to perform the operations described herein. The communication circuitry 138 includes an antenna, a transceiver, and other communication circuitry configured to enable the first spacecraft 130 to perform wireless communications with the ground station 104. Due to the functioning of the antenna 102, the communication circuitry 138 can be smaller than communication circuitry located on-board conventional satellites. In some implementations, the communication circuitry 138 is similar to communication circuitry found in satellite phones, and has dimensions that are smaller than a few inches or centimeters. The second spacecraft 132 also includes a processor, a memory, and communication circuitry, similar to the first spacecraft 130.

In some implementations, the first spacecraft 130 and the second spacecraft 132 move with respect to one or more fixed positions on the Earth. The spacecraft travel in particular orbits of the Earth. To illustrate, in a particular implementation, the first spacecraft 130, the second spacecraft 132, or both, travel in low Earth orbit (LEO). In another implementation, the first spacecraft 130, the second spacecraft 132, or both, travel in medium Earth orbit (MEO). In another implementation, the first spacecraft 130, the second spacecraft 132, or both, travel in a high Earth orbit (HEO). Additionally, the first spacecraft 130 and the second spacecraft 132 can be in the same type of orbit or different types of orbit. As a first example, the first spacecraft 130 and the second spacecraft 132 travel in LEO. As a second example, the first spacecraft 130 travels in MEO and the second spacecraft 132 travels in HEO. Additionally, or alternatively, the first spacecraft 130, the second spacecraft 132, or both travel in or near geostationary orbit. These examples are for illustration only and are not limiting.

The first spacecraft 130 and the second spacecraft 132 are configured to perform persistent communications. For example, the first spacecraft 130 and the second spacecraft 132 are configured to transmit beacon messages. The persistent communications (e.g., the beacon messages) can be used by the ground station 104 to determine a location of the first spacecraft 130 and the second spacecraft 132.

To illustrate, the antenna 102 is configured to receive the persistent communications (or other communications) from the first spacecraft 130 and the second spacecraft 132 via the plurality of signal beams 120. Based on which signal beam is used to receive the communication, the processor 106 is configured to determine a location of the first spacecraft 130 and a location of the second spacecraft 132 with respect to the plurality of cells 122, as further described herein. The processor 106 is further configured to estimate orbital paths of the first spacecraft 130 and the second spacecraft 132 based on the determined locations, and to identify the first spacecraft 130 and the second spacecraft 132 by matching the estimated orbital paths to orbital paths indicated by the spacecraft orbit data 110, as further described with reference to FIG. 3.

After identifying the first spacecraft 130 or the second spacecraft 132, and estimating the respective orbital paths, the processor 106 is configured to perform communications with the first spacecraft 130 of the second spacecraft 132. For example, if data is pending for the first spacecraft 130 after identification of the first spacecraft 130, the processor 106 initiates, via the antenna 102, transmission of the data to the first spacecraft 130 via a signal beam that corresponds to an estimated location of the first spacecraft 130. As another example, if data is pending for the second spacecraft 132 after identification of the second spacecraft 132, the processor 106 initiates, via the antenna 102, transmission of the data to the second spacecraft 132 via a signal beam that corresponds to an estimated location of the second spacecraft 132. Thus, communications with a particular spacecraft can begin after identification of the particular spacecraft. Additionally, or alternatively, the processor 106 may initiate transmission of data to a group of spacecraft via multiple signal beams. Additionally, or alternatively, the antenna 102 is further configured to receive communication signals or data from the first spacecraft 130, and the data is passed to the processor 106 for processing.

Because the ground station 104 is configured to identify spacecraft based on estimated orbital paths, as further described with reference to FIG. 3, the spacecraft are not required to include identification data that identifies the spacecraft as particular spacecraft in transmissions to the ground station 104. For example, some conventional satellite communication systems require the satellites to include identification information in each message that is transmitted by the satellites. In the implementations described herein, the spacecraft of the system 100 do not include identification information in each transmission to the ground station 104. Instead, characteristics of the messages, such as particular time slots of communication, particular codes used to encode the messages, or particular frequency bands of communication, are used to distinguish the spacecraft and to enable determination of locations corresponding to the spacecraft. The locations are used by the ground station 104 to identify the spacecraft as particular spacecraft, as further described herein. Sending messages without identification information that identifies the spacecraft as particular spacecraft reduces the size of the messages, which reduces network congestion and improves throughput of the system 100. In other implementations, identification based on locations of spacecraft (with respect to the plurality of cells 122) is used as a first form of identification, and analyzing and processing of messages received from the spacecraft (to parse identifying information included in the messages, such as identifying information embedded in the protocol stack) is used as a second form of identification. The second form of identification can be used to verify the first form of identification.

In some implementations, the estimated orbital paths are used to detect unknown spacecraft. For example, if the estimated orbital path of a particular spacecraft fails to match an orbital path of any known spacecraft (e.g., a constellation of spacecraft that are monitored and controlled by the ground station 104), the particular spacecraft is identified as an unknown spacecraft (e.g., a spacecraft that is not part of the constellation). Identification of unknown spacecraft can be used as an adjunct capability to assess spacecraft that have changed orbit due to malfunction or as a way to discriminate between spacecraft of other constellations (e.g., that are monitored and controlled by other ground stations). For example, an unknown spacecraft can be identified as a spacecraft that is missing from its expected orbital path, which indicates that the spacecraft has changed orbital path (e.g., due to malfunction or interference). A determination that a spacecraft is no longer travelling along a designated orbital path can be the basis for triggering one or more operations, as further described herein.

In a particular implementation, the antenna 102 is configured to perform concurrent communications with the first spacecraft 130 and the second spacecraft 132 via L band frequencies. Communicating via the L band frequency range enables a data rate that supports communication of both mission data and command and control data to the first spacecraft 130 and the second spacecraft 132. In other implementations, the communications can be performed via S band frequencies, C band frequencies, X band frequencies, Ku band frequencies, K band frequencies, Ka band frequencies, or other frequency bands.

During operation, the antenna 102 generates the plurality of signal beams 120 that define the plurality of cells 122 in the sky. The plurality of cells 122 is defined at a particular distance from the antenna 102. For example, the plurality of cells 122 is defined at a LEO distance, a MEO distance, or a HEO distance, as non-limiting examples. The plurality of cells 122 represents a coverage area of communications from the antenna 102. In a particular implementation, the coverage area is a horizon-to-horizon coverage area. The number of cells and the size and shape of the cells are based on beam forming parameters and characteristics of the antenna elements of the antenna 102, as further described with reference to FIG. 2. In a particular implementation, each cell is approximately four kilometers across at a distance associated with LEO.

The processor 106, via the antenna 102, performs concurrent communications with the first spacecraft 130 and the second spacecraft 132. For example, the processor 106 initiates concurrent transmission of data via the antenna 102 to the first spacecraft 130 and to the second spacecraft 132. As another example, the antenna 102 transmits data to the first spacecraft 130 while a portion of data is received from the second spacecraft 132. The concurrent communications can be performed in accordance with one or more communication protocols, such as a TDMA protocol, a CDMA protocol, a FDMA or OFDMA protocol, or another protocol. The communications are performed via a signal beam of the plurality of signal beams 120. For example, data can be transmitted to the first spacecraft 130 via the first signal beam 120A when the first spacecraft 130 is located within the first cell 122A. If the spacecraft are located within the same cell, the antenna 102 communicates with the spacecraft independently via separate logical channels. As the spacecraft traverse the plurality of cells 122, communications with the spacecraft are handed off from signal beam to signal beam. Signal beam handoff is performed in accordance with the communication protocol used to communicate with the spacecraft.

Additionally, the ground station 104 determines locations of the spacecraft with respect to the plurality of cells 122. For example, at a first time t1, the first spacecraft 130 is located within a first cell 122A of the plurality of cells 122 and the second spacecraft 132 is located within a second cell 122B of the plurality of cells 122. The antenna 102 receives a first communication signal from the first spacecraft 130 via a first signal beam 120A of the plurality of signal beams 120. Additionally, the antenna 102 receives a second communication signal from the second spacecraft 132 via a second signal beam 120B of the plurality of signal beams 120. The processor 106 distinguishes between the two spacecraft based on characteristics of the communication signals that are received, such as time slots, codes, or frequency bands associated with the communication signals. By identifying that the first communication signal is received via the first signal beam 120A, the processor 106 determines that the first spacecraft 130 is located within a region corresponding to the first cell 122A. Similarly, by identifying that the second communication signal is received via the second signal beam 120B, the processor 106 determines that that second spacecraft 132 is located within a region corresponding to the second cell 122B. Additional locations can be determined as the first spacecraft 130 and the second spacecraft 132 traverse their respective orbital paths, and based on the locations, the processor 106 determines estimated orbital paths corresponding to the first spacecraft 130 and the second spacecraft 132. Based on the estimated orbital paths, the processor 106 identifies the first spacecraft 130 and the second spacecraft 132, as further described with reference to FIG. 3.

In a particular implementation, the amplitude profile of each beam is not uniform (e.g., the signal power achieved at various points within a cell is different). For example, a signal power at the center of a cell is the highest, with signal power decreasing toward the outer edges of the cell. Due to this signal power profile, a location of a spacecraft within a cell can be determined. For example, the processor 106 measures a signal power associated with the first communication signal received from the first spacecraft 130. Based on the measured signal power, the processor 106 determines a location of the first spacecraft 130 within the first cell 122A.

Tracking the spacecraft (e.g., determining the locations of the spacecraft) is performed without performing a scanning operation to determine the locations of the spacecraft. Conventional satellite systems send a ranging signal from a ground-based antenna to the satellites as part of a scanning operation to determine the locations of a satellite. Once the locations of the satellites are determined, the ground-based antenna tracks the satellite by changing an orientation of the antenna as the satellite moves across the sky. However, in some implementations, the antenna 102 of the present disclosure is fixed to a particular orientation. Accordingly, the antenna 102 does not move to track the spacecraft. Additionally, because the spacecraft are monitored by monitoring communications from the spacecraft via the plurality of signal beams 120, the antenna 102 does not send a ranging signal to the spacecraft or perform a scanning operation (including pointing, acquisition, and tracking) to communicatively connect to the spacecraft. Because the ranging signal is not used, the communication circuitry located on-board the spacecraft is not required to include ranging circuits and related hardware, which reduces the cost and complexity of the communication circuitry located on-board the spacecraft.

The system 100 provides multiple benefits over conventional satellite systems. As one example, because the antenna 102 is configured to communicate via the plurality of signal beams 120, the antenna 102 is able to perform concurrent communications with multiple spacecraft. Although two spacecraft are described, in other implementations, more than two spacecraft can be included in the system 100. For example, the antenna 102 is capable of concurrently communicating with tens to hundreds of spacecraft, depending on the number and configuration of the antenna elements that form the antenna 102. Performing concurrently communications with multiple spacecraft enables the ground station 104 to communicate with and control a constellation of satellites (or other spacecraft) using a single ground-based antenna (e.g., the antenna 102).

Additionally, the system 100 enables design and use of smaller spacecraft compared to other satellite systems. For example, because the antenna 102 is able to communicate with multiple spacecraft via the plurality of signal beams 120, the communication circuitry that is included on-board the spacecraft can be smaller than communication circuitry on-board conventional satellites. For example, the communication circuitry on-board the spacecraft can be similar in size and area/volume to communication circuitry used in satellite phones. Due to the small size of the communication circuitry (e.g., antenna(s), transceivers, radio-frequency circuitry, etc.), the overall size of the spacecraft (e.g., satellites) can be reduced as compared to conventional satellites. For example, "CubeSats" (e.g., satellites having an approximately cubed shape and small size, sometimes as small as a few centimeters in each dimension) can be equipped with the smaller communication circuitry without significantly increasing the overall size of the CubeSat. CubeSats are typically measured by volume, with a CubeSat of one unit ("1U") having a volume of 10 cubic centimeters. Other standard CubeSat sizes exist, such as 0.5U, 1.5U, 2U, 3U, 6U, and 12U. Thus, CubeSats have limited area available for communication circuitry. Additionally, such communication circuitry uses less power than the larger antennas of conventional satellites, thereby reducing the overall power requirements of the spacecraft of the system 100.

Another benefit of the system 100 is reduced cost and complexity of the ground-based antenna. For example, the antenna 102 can be fixed to a particular orientation while still providing horizon-to-horizon coverage via the plurality of signal beams 120 (that defines the plurality of cells 122). Because the antenna 102 is fixed to the particular orientation, the antenna 102 does not require gimbals, motors, or other components to change an orientation of the antenna 102 to enable tracking of spacecraft across the sky. Because the gimbals, motors, and other components are not included, the antenna 102 has reduced cost and complexity compared to other ground-based antennas of other satellite systems.

Yet another benefit of the system 100 is improved identification of spacecraft. For example, as further described with reference to FIG. 3, the processor 106 is able to identify spacecraft based on estimated orbital paths of the spacecraft. Because spacecraft are identified in this manner, in some implementations, the spacecraft are not required to transmit identifying information that identifies the spacecraft as particular spacecraft with each message. The processor 106 can distinguish between the spacecraft based on characteristics of the communication signals and determine estimated orbital paths for the spacecraft based on locations of the spacecraft at particular times. The estimated orbital paths (and the locations of the spacecraft along the estimated orbital paths) are used to determine which signal beams are used to communicate with the spacecraft at particular times. In some implementations, the estimated orbital paths are used to identify the spacecraft instead of information contained within the communication signals, as further described with reference to FIG. 3. Thus, the size of messages may be decreased or the amount of payload in messages may be increased, thereby reducing network congestion and/or improving overall throughput within the system 100.

Figure 2:
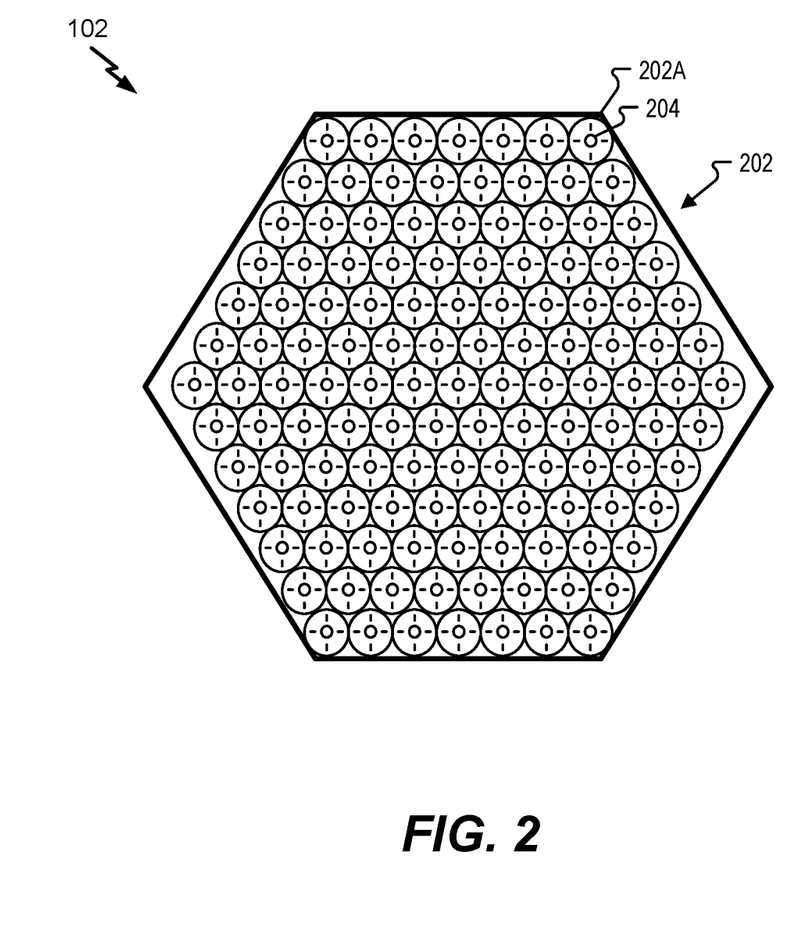
FIG. 2 illustrates a particular implementation of the antenna of FIG. 1.

FIG. 2 illustrates a particular implementation of the antenna 102 of FIG. 1. The antenna 102 includes a plurality of antenna elements 202 arranged in an array. The plurality of antenna elements 202 includes an illustrative antenna element 202A. Each antenna element of the plurality of antenna elements 202 includes a feed horn coupled to the antenna element. For example, the antenna element 202A includes a feed horn 204 coupled to the antenna element 202A. In a particular implementation, the feed horn 204 is configured to provide radio waves from a transceiver to the antenna element 202A for transmission. Additionally, the feed horn 204 is configured to capture received radio waves and to provide the received radio waves to the transceiver for processing. In a particular implementation, each antenna element of the plurality of antenna elements 202 includes a reflector configured to reflect radio waves received from the feed horn to generate a corresponding signal beam. In an alternate implementation, the signal beam is generated through direct radiation from the feed horn (e.g., the antenna elements do not include reflectors).

The antenna 102 is configured to perform beam forming to direct the plurality of signal beams 120 to form the plurality of cells 122 of FIG. 1. In beam forming, signals generated by multiple elements are combined (through constructive and destructive interference) to produce signal breams having particular directions. To enable beam forming, the antenna 102 also includes a beam forming network coupled to feed horns of the plurality of antenna elements 202. The beam forming network is configured to control the amplitude and phase of the signals generated by the plurality of antenna elements 202. The beam forming network controls the amplitudes and the phases based on beam forming parameters. Control of the amplitude and phase of the signals enables generation of signal beams directional signal beams for transmission or reception. Because the signal beams are directed, the signal beams can be directed to form the plurality of cells 122 of FIG. 1.

In some implementations, each antenna element of the plurality of antenna elements 202 is fixed to a corresponding orientation. For example, each antenna element is fixed to a respective orientation that enables generation of a signal beam that defines a corresponding cell of the plurality of cells 122 of FIG. 1. To further illustrate, beam forming parameters associated with each of the antenna elements of the plurality of antenna elements are fixed. Because the beam forming parameters are fixed, the signal beams generated by the antenna 102 have fixed characteristics (e.g., size, shape) and are targeted to fixed locations in the sky.

Characteristics of the signal beams generated by the plurality of antenna elements 202, and thus characteristics of the cells defined by the signal beams, are based on the beam forming parameters and characteristics of the plurality of antenna elements 202. For example, a size and shape of the cell defined by a signal beam is based on beam forming parameters associated with one or more of the antenna elements of the plurality of antenna elements 202. For example, the beam forming parameters control a relative amplitude and phase of signals generated by corresponding antenna elements, and the amplitude and phase affect a direction of the signal beam (e.g., a location of a corresponding cell) and a size and shape of the corresponding cell. Additionally, characteristics of the cell can be based on other characteristics of the antenna element, such as a diameter of the feed horn of the corresponding antenna element, a shape or type of the reflector, or other characteristics. In a particular implementation, each antenna element of the plurality of antenna elements 202 is fixed to a corresponding orientation (e.g., the beam forming parameters are fixed) such that the plurality of cells 122 of FIG. 1 have a fixed pattern of cells in the sky.

In a particular implementation, the antenna 102 includes 128 antenna elements configured to generate multiple cells, each cell being four kilometers across at LEO and having an elliptical shape. In other implementations, the antenna 102 includes a different number of antenna elements, the cells have different shapes (e.g., circles, rectangles, squares, hexagons or other polygons, etc.), the cells are different sizes, or a combination thereof.

Figure 3:
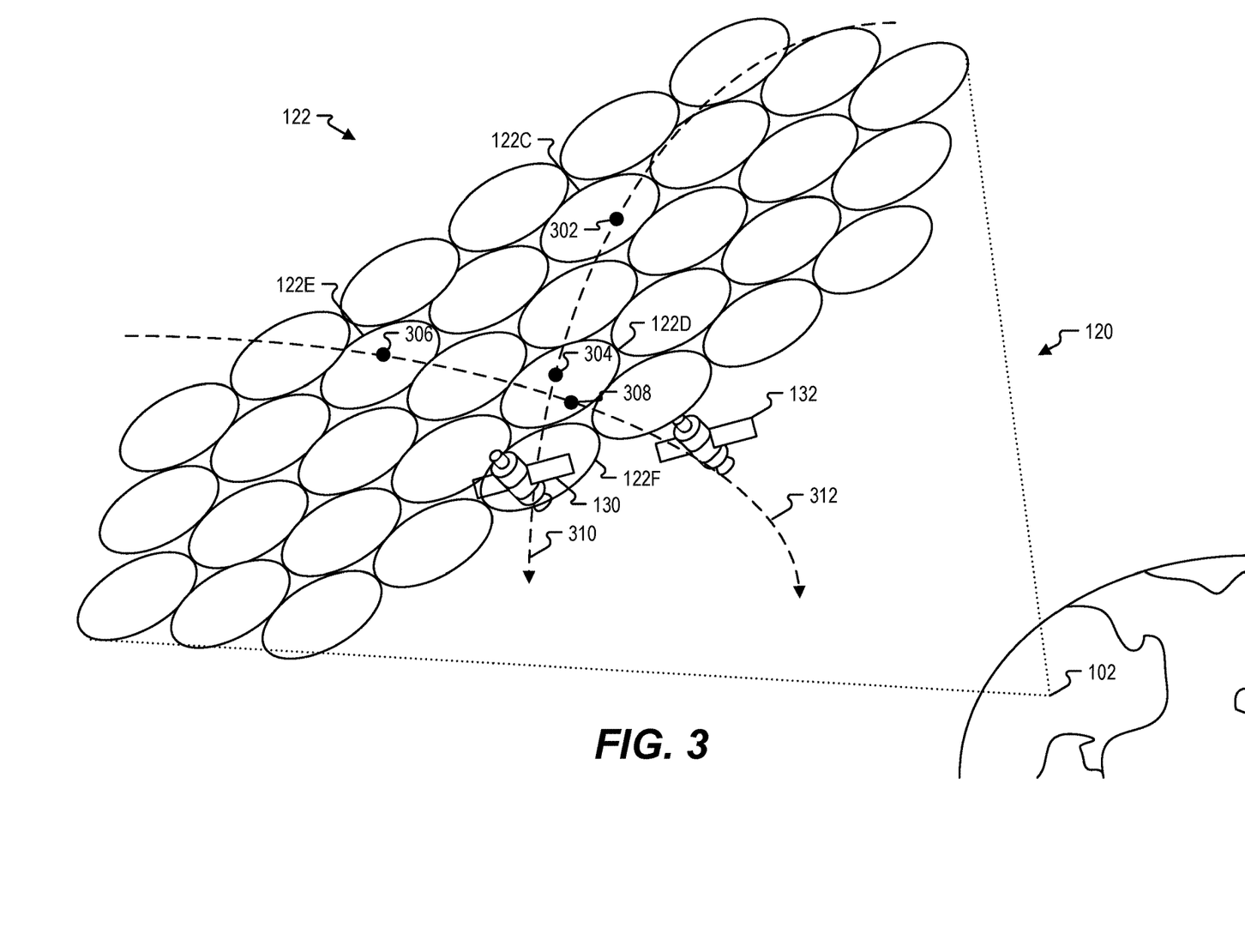
FIG. 3 is a diagram that illustrates estimation of orbital paths of spacecraft using the antenna of FIG. 1.

FIG. 3 illustrates estimation of orbital paths of spacecraft using the antenna 102 of FIG. 1. In a particular implementation, the processor 106 of the ground station 104 is configured to perform the operations described with reference to FIG. 3.

As explained with reference to FIG. 1, the antenna 102 generates the plurality of signal beams 120 that define the plurality of cells 122 in the sky. Although the plurality of cells 122 is illustrated as non-overlapping, in some implementations the cells of the plurality of cells 122 overlap such that a continuous region of coverage is defined in the sky. As the first spacecraft 130 and the second spacecraft 132 traverse the plurality of cells 122, the first spacecraft 130 and the second spacecraft 132 transmit persistent communications, such as beacon signals, to the ground station 104. In a particular implementation, the persistent communications are transmitted periodically throughout a lifespan of the spacecraft. In alternate implementations, the spacecraft transmit the persistent communications when the spacecraft are within a coverage range of the plurality of cells 122. For example, the spacecraft can use a timer (e.g., to count down that time between times when the spacecraft are within the plurality of cells 122) or positioning circuitry, such as global positioning system (GPS) circuitry, to determine that the spacecraft are within the plurality of cells 122. The antenna 102 receives the persistent communications via the plurality of signal beams 120, and the processor 106 is configured to determine locations of the first spacecraft 130 and the second spacecraft 132 based on the received signals.

To illustrate, at a first time t1, the first spacecraft 130 is located at a first location 302 within a third cell 122C of the plurality of cells 122. The antenna 102 receives a third communication signal at the first time t1 from the first spacecraft 130 via a third signal beam of the plurality of signal beams 120, the third signal beam defining the third cell 122C. The processor 106 determines the first location 302 of the first spacecraft 130 with respect to the plurality of cells 122 based on receipt of the third communication signal. For example, the processor 106 identifies that the third communication signal is received via the third signal beam, and the processor 106 identifies that the third signal beam defines the third cell 122C. The processor further distinguishes the first spacecraft 130 from other spacecraft based on characteristics of the third communication signal, such as time slots associated with the third communication signal, codes associated with the third communication signal, frequency bands associated with the third communication signal, or other unique characteristics. Thus, the processor 106 determines that the first spacecraft 130 is located within the third cell 122C at the first time t1, which corresponds to a particular region of the sky. In some implementations, the processor 106 accesses a mapping of the plurality of cells 122 to locations with respect to the Earth to determine the first location 302. In a particular implementation, the processor 106 determines the first location 302 within the third cell 122C based on a signal power of the third communication signal. To illustrate, the processor 106 measures a signal power of the third communication signal and compares the signal power of the third communication signal to one or more reference signal powers, such as an estimated maximum signal power and/or an estimated minimum signal power, to determine the first location 302 with reference to the center of the third cell 122C. For example, if the measured signal power is approximately equal to the estimated maximum signal power, the first spacecraft 130 is located approximately at the center of the third cell 122C. The signal power of the third communication signal decreases as the first spacecraft 130 nears the edges of the third cell 122C, thus the lower the measured signal power, the closer to the edge of the third cell 122C the first spacecraft 130 is located.

At a second time t2 that is subsequent to the first time t1, the first spacecraft 130 is located at a second location 304 within a fourth cell 122D of the plurality of cells 122. The antenna 102 receives a fourth communication signal at the second time t2 from the first spacecraft 130 via a fourth signal beam of the plurality of signal beams 120, the fourth signal beam defining the fourth cell 122D. The processor 106 determines the second location 304 of the first spacecraft 130 with respect to the plurality of cells 122 based on receipt of the fourth communication signal. For example, the processor 106 identifies that the fourth communication signal is received via the fourth signal beam, and the processor 106 identifies that the fourth signal beam defines the fourth cell 122D. The processor 106 distinguishes the first spacecraft 130 from other spacecraft based on characteristics of the fourth communication signal. Thus, the processor 106 determines that the first spacecraft 130 is located within the fourth cell 122D at the second time t2, which corresponds to a particular region of the sky, and thus a particular location with respect to the Earth. In a particular implementation, the processor 106 determines the second location 304 within the fourth cell 122D based on a signal power of the fourth communication signal.

After determining the first location 302 and the second location 304, the processor 106 determines an estimated path 310 of the first spacecraft 130 based at least in part on the first location 302 and the second location 304. For example, based on the first location 302, the second location 304, and any intervening locations, the processor 106 constructs the estimated path 310. As additional communication signals are received from the first spacecraft 130 and additional locations are determined, the processor 106 can refine the estimated path 310.

Similarly, the processor 106 determines locations and performs path estimation for the second spacecraft 132. To illustrate, at the first time t1, the second spacecraft 132 is located at a third location 306 within a fifth cell 122E of the plurality of cells 122. The antenna 102 receives a fifth communication signal at the first time t1 from the second spacecraft 132 via a fifth signal beam of the plurality of signal beams 120, the fifth signal beam defining the fifth cell 122E. The processor 106 determines the third location 306 of the second spacecraft 132 with respect to the plurality of cells 122 based on receipt of the fifth communication signal. For example, the processor 106 identifies that the fifth communication signal is received via the fifth signal beam, and the processor 106 identifies that the fifth signal beam defines the fifth cell 122E. The processor 106 distinguishes the second spacecraft 132 from other spacecraft based on characteristics of the fifth communication signal. Thus, the processor 106 determines that the second spacecraft 132 is located within the fifth cell 122E at the first time t1, which corresponds to a particular region of the sky. In a particular implementation, the processor 106 determines the third location 306 within the fifth cell 122E based on a signal power of the fifth communication signal.

At the second time t2, the second spacecraft 132 is located at a fourth location 308 within the fourth cell 122D. The antenna 102 receives a sixth communication signal at the second time t2 from the second spacecraft 132 via the fourth signal beam, the fourth signal beam defining the fourth cell 122D. The processor 106 determines the fourth location 308 of the second spacecraft 132 with respect to the plurality of cells 122 based on receipt of the sixth communication signal. For example, the processor 106 identifies that the sixth communication signal is received via the fourth signal beam, and the processor 106 identifies that the fourth signal beam defines the fourth cell 122D. The processor 106 distinguishes the second spacecraft 132 from other spacecraft based on characteristics of the sixth communication signal. Thus, the processor 106 determines that the second spacecraft 132 is located within the fourth cell 122D at the second time t2, which corresponds to a particular region of the sky, and thus a particular location with respect to the Earth. In a particular implementation, the processor 106 determines the fourth location 308 within the fourth cell 122D based on a signal power of the sixth communication.

After determining the third location 306 and the fourth location 308, the processor 106 determines an estimated path 312 of the second spacecraft 132 based at least in part on the third location 306 and the fourth location 308. For example, based on the third location 306, the fourth location 308, and any intervening locations, the processor 106 constructs the estimated path 312. As additional communication signals are received from the second spacecraft 132 and additional locations are determined, the processor 106 can refine the estimated path 312.

The precision of the estimated paths, and the determined locations, is based on the size of the cells of the plurality of cells 122. For example, locations and estimated paths determined based on larger cells are less precise than locations and estimated paths based on smaller cells. In a particular implementation, the antenna 102 is designed such that neighboring cells are approximately one degree apart from one another with respect to the position of the antenna 102 (e.g., a position on the Earth). In this implementation, the first spacecraft 130 and the second spacecraft 132 can be within one degree of each other and be within different cells of the plurality of cells 122. Thus, concurrent communications with two spacecraft that are within one degree of each other can be performed by performing communications via two signal beams of the plurality of signal beams 120.

In addition to determining locations of the spacecraft, the processor 106 is also configured to determine speeds of the spacecraft. For example, the processor 106 determines a speed of the first spacecraft 130 based on a ratio of a difference between the second location 304 and the first location 302 and a difference between the second time t2 and the first time t1. Similarly, the processor determines a speed of the second spacecraft 132 based on a ratio of a difference between the fourth location 308 and the third location 306 and the difference between the second time t2 and the first time t1.

After estimating the estimated path 310 and the estimated path 312, the first spacecraft 130 and the second spacecraft 132 are identified based on the estimated paths. To illustrate, to identify the first spacecraft 130, the processor 106 compares the estimated path 310 of the first spacecraft 130 to the spacecraft orbit data 110 stored at the memory 108 of FIG. 1. The spacecraft orbit data 110 stores data indicating one or more orbital paths of one or more spacecraft. For example, the spacecraft orbit data 110 can indicate orbital paths of one or more spacecraft operated by an operator associated with the ground station 104. As another example, the spacecraft orbit data 110 can indicate one or more orbital paths of spacecraft that are registered with a government agency or other institution.

The processor 106 compares the estimated path 310 to the spacecraft orbit data 110 to determine whether the estimated path 310 matches an orbital path identified by the spacecraft orbit data 110. If a match is detected, the first spacecraft 130 is identified based on the match. For example, if the spacecraft orbit data 110 indicates orbital paths for "Spacecraft A," "Spacecraft B," "Spacecraft C," and "Spacecraft D," and if the processor 106 determines that the estimated path 310 of the first spacecraft 130 matches the orbital path for Spacecraft A, the processor 106 identifies the first spacecraft 130 as Spacecraft A. As another example, if the processor 106 determines that the estimated path 312 of the second spacecraft 132 matches the orbital path for Spacecraft C, the processor 106 identifies the second spacecraft 132 as Spacecraft C.

In some implementations, two spacecraft can share the same orbital path. For example, the spacecraft orbit data 110 can indicate that Spacecraft A and Spacecraft B share the same orbital path, with Spacecraft B trailing Spacecraft A by a particular amount of time. In such implementations, the processor 106 can determine the identity of the first spacecraft 130 and the second spacecraft 132 based on traversals of the corresponding orbital path at a particular time. To illustrate, if the estimated path 310 of the first spacecraft 130 and the estimated path 312 of the second spacecraft 132 both match the orbital paths of Spacecraft A and Spacecraft B, the processor 106 determines whether the first spacecraft 130 or the second spacecraft 132 is farther along the orbital path of Spacecraft A (or the orbital path of Spacecraft B) at a particular time. If the first spacecraft 130 is farther along the orbital path than the second spacecraft 132, and the spacecraft orbit data 110 indicates that Spacecraft B trails Spacecraft A, the processor 106 identifies the first spacecraft 130 as Spacecraft A and identifies the second spacecraft 132 as Spacecraft B. Alternatively, if the second spacecraft 132 is farther along the orbital path that the first spacecraft 130, the processor 106 identifies the first spacecraft 130 as Spacecraft B and identifies the second Spacecraft 132 as spacecraft A.

In some implementations, a new spacecraft is identified if the corresponding estimated path does not match any orbital path identified by the spacecraft orbit data 110. To illustrate, if the processor 106 determines that the estimated path 310 of the first spacecraft 130 does not match any orbital path identified by the spacecraft orbit data 110, the processor 106 identifies the first spacecraft 130 as a new spacecraft and assigns a new identifier to the first spacecraft 130. Additionally, the processor 106 stores the estimated path 310 as the orbital path associated with the new spacecraft. Alternatively, the processor 106 determines that an error condition has occurred, and one or more corrective actions can be initiated. For example, if a spacecraft does not match any orbital path identified by the spacecraft orbit data 110, that spacecraft may have changed orbital paths. Identification of spacecraft that have changed orbital paths may be important for identifying when a spacecraft has encountered an unexpected condition that caused the spacecraft to change course. One or more corrective actions can be initiated, such as displaying a warning to a user at the ground station 104 or initiating an operation to correct the orbital path, such as sending control data to the first spacecraft 130.

After identifying the spacecraft, the processor 106 is configured to estimate future locations of the spacecraft and to perform communications with the spacecraft. For example, after identifying the first spacecraft 130 as Spacecraft A, the processor 106 can determine a future location of the first spacecraft 130 at a particular time. To further illustrate, the processor 106 determines a current location of the first spacecraft 130 based on a communication signal received from the first spacecraft 130, which indicates a particular signal beam and thus a particular cell within which the first spacecraft 130 is located. The processor 106 can then extrapolate, based on the particular time and an estimated speed of the first spacecraft 130, where the first spacecraft 130 will be along the orbital path associated with Spacecraft A. In some implementations, the orbital paths identified by the spacecraft orbit data 110 are more precise than the estimated paths determined based on traversal of the plurality of cells 122 (e.g., due to the size of the plurality of cells 122), thus, the orbital paths identified by the spacecraft orbit data 110 are used to estimate the future positions of the spacecraft. In other implementations, the estimated paths are used to estimate the future location of the spacecraft.

Additionally, the processor 106 can initiate transmission of particular data corresponding to spacecraft A to the first spacecraft 130 using a signal beam that corresponds to the future location (e.g., to the cell within which the first spacecraft 130 will be located at the particular time). For example, if the processor 106 determines that the first spacecraft 130 will be located within a sixth cell 122F at the particular time, the processor 106 causes the antenna 102 to transmit, via a signal beam that defines the sixth cell 122F, data designated for Spacecraft A. In this manner, data received at or generated by the ground station 104 for Spacecraft A can be transmitted to the first spacecraft 130 using one or more signal beams of the plurality of signal beams 120. Additionally, or alternatively, data designated for multiple spacecraft can be transmitted either by transmitting the data via all available signal beams or by transmitting the data via signal beams corresponding to the future locations of the spacecraft. For example, cluster management can be performed by transmitting data via each signal beam of the plurality of signal beams 120 without determining where the spacecraft are located.

A benefit illustrated in FIG. 3 is improved identification of spacecraft. For example, the processor 106 is able to identify spacecraft based on estimated orbital paths of the spacecraft. The estimated paths are determined based on locations derived from determining which signal beam is used to receive communication signals from the spacecraft. The estimated orbital paths can be used to determine which signal beams are used to communicate with the spacecraft at particular times. Because spacecraft are identified in this manner, in some implementations, the spacecraft are not required to transmit identifying information that identifies the particular spacecraft within each message. For example, the first spacecraft 130 is not required to transmit information that identifies the first spacecraft 130 as Spacecraft A. Instead, characteristics of the messages are used to distinguish between the different spacecraft for determining locations and estimating paths. Thus, the size of messages that are communicated from the spacecraft to the antenna 102 may be decreased (e.g., because no identification information that identifies the spacecraft as particular spacecraft is included in the messages) or the amount of payload in messages may be increased, thereby reducing network congestion and/or improving overall throughput within the system 100. In other implementations, messages from the spacecraft include identification information, and the identification information is used to verify the identification performed based on the locations of the spacecraft.

Figure 4:
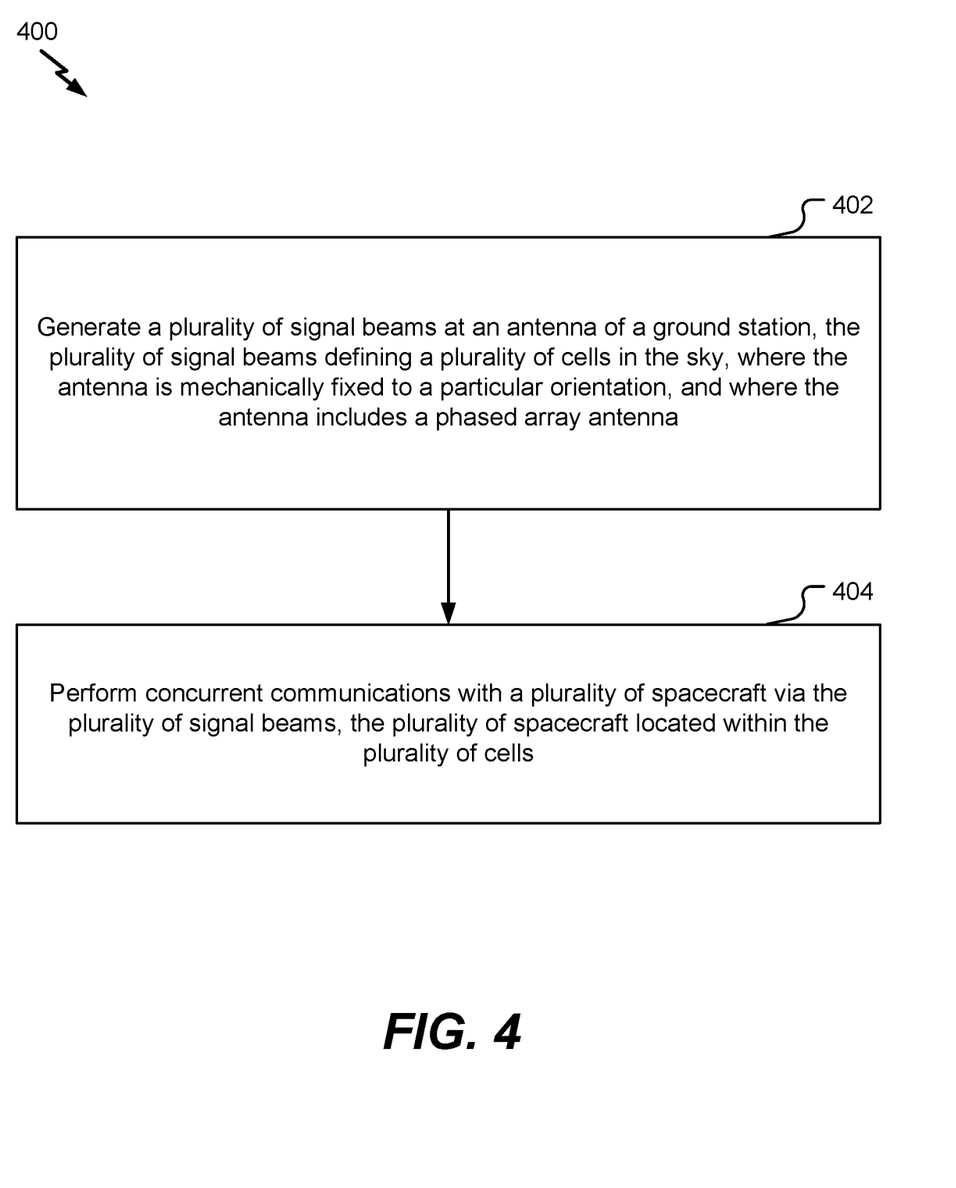
FIG. 4 is a flow chart of an example of a method of performing concurrent communications with multiple spacecraft.

FIG. 4 illustrates a method 400 of performing concurrent communications with multiple spacecraft. In a particular implementation, the method 400 is performed by elements of the ground station 104 of FIG. 1, such as the processor 106 and the antenna 102.

The method 400 includes generating a plurality of signal beams at an antenna of a ground station, at 402. The plurality of signal beams defines a plurality of cells in the sky. The antenna is mechanically fixed to a particular orientation, and the antenna includes a phased array antenna. For example, the antenna 102 of FIG. 1 generates the plurality of signal beams 120. The plurality of signal beams 120 defines the plurality of cells 122 in the sky. In a particular implementation, the antenna 102 is fixed to a particular orientation, as described with reference to FIG. 1. In a particular implementation, the antenna 102 is a phased array antenna, as further described with reference to FIG. 2.

The method 400 also includes performing concurrent communications with a plurality of spacecraft via the plurality of signal beams, at 404. The plurality of spacecraft is located within the plurality of cells. For example, while the first spacecraft 130 and the second spacecraft 132 are located within the plurality of cells 122 of FIG. 1, the antenna 102 is configured to perform concurrent communications with the first spacecraft 130 and the second spacecraft 132.

In a particular implementation, the method 400 includes receiving, via the antenna, a first communication from a first spacecraft of the plurality of spacecraft. The first communication signal is received via a first signal beam of the plurality of signal beams. For example, with reference to FIG. 3, the antenna 102 receives a first communication from the first spacecraft 130 via a signal beam (corresponding to the third cell 122C). In this implementation, the method 400 includes determining a first location of the first spacecraft with respect to the plurality of cells based on receipt of the first communication signal. For example, the first location 302 of FIG. 3 is determined based on receipt of the first communication signal via a signal beam corresponding to the third cell 122C. In this implementation, the method 400 includes receiving, via the antenna, a second communication signal from the first spacecraft. The second communication signal is received via a second signal beam of the plurality of signal beams. For example, the antenna 102 receives a second communication from the first spacecraft 130 via a different signal beam (corresponding to the fourth cell 122D). In this implementation, the method 400 includes determining a second location of the first spacecraft with respect to the plurality of cells based on receipt of the second communication signal. For example, the second location 304 is determined based on receipt of the second communication signal via a signal beam corresponding to the fourth cell 122D. In this implementation, the method 400 further includes determining an estimated path of the first spacecraft based at least in part on the first location and the second location. For example, the estimated path 310 of the first spacecraft 130 may be determined based on the first location 302 and the second location 304 (and any other locations determined based on communications received while the first spacecraft 130 is located in any other cells of the plurality of cells 122).

In some implementations, the method 400 further includes determining whether the estimated path matches an orbital path identified by spacecraft orbit data stored at a memory and, responsive to determining that the estimated path matches a particular orbital path of a particular spacecraft, identifying the first spacecraft as the particular spacecraft. For example, the processor 106 compares the estimated path 310 to a particular orbital path for Spacecraft A that is represented by the spacecraft orbit data 110. Responsive to the estimated path 310 matching the particular orbital path, the first spacecraft 130 is identified as Spacecraft A. In some implementations, the method 400 further includes, responsive to identifying the first spacecraft as the particular spacecraft, initiating transmission of particular data associated with the particular spacecraft to the first spacecraft via one or more of the plurality of signal beams. For example, data associated with Spacecraft A is transmitted to the first spacecraft 130 via a signal beam that corresponds to an estimated location of the first spacecraft 130. In some implementations, the method 400 further includes estimating a future location of the first spacecraft based on the particular orbital path. For example, based on the particular orbital path, a future location (e.g., a cell in which the first spacecraft 130 will be located) is determined.

In some implementations, the method 400 further includes receiving, via the antenna, a third communication from a second spacecraft of the plurality of spacecraft. The third communication signal is received via a third signal beam of the plurality of signal beams. For example, with reference to FIG. 3, the antenna 102 receives a third communication from the second spacecraft 132 via a signal beam (corresponding to the fifth cell 122E). In this implementation, the method 400 includes determining a third location of the second spacecraft with respect to the plurality of cells based on receipt of the third communication signal. For example, the third location 306 of FIG. 3 is determined based on receipt of the third communication signal via a signal beam corresponding to the fifth cell 122E. In this implementation, the method 400 includes receiving, via the antenna, a fourth communication signal from the second spacecraft. The fourth communication signal is received via the second signal beam. For example, the antenna 102 receives a fourth communication from the second spacecraft 132 via the signal beam corresponding to the fourth cell 122D. In this implementation, the method 400 includes determining a fourth location of the second spacecraft with respect to the plurality of cells based on receipt of the fourth communication signal. For example, the fourth location 308 is determined based on receipt of the fourth communication signal via the signal beam corresponding to the fourth cell 122D. In this implementation, the method 400 further includes determining an estimated path of the second spacecraft based at least in part on the third location and the fourth location. For example, the estimated path 312 of the second spacecraft 132 may be determined based on the third location 306 and the fourth location 308 (and any other locations determined based on communications received while the second spacecraft 132 is located in any other cells of the plurality of cells 122). In a particular implementation, the first spacecraft and the second spacecraft are located within 1 degree of each other, at a particular time, with respect to a point on the Earth, and the concurrent communications are performed at the particular time. For example, the second location 304 and the fourth location 308 may be within 1 degree of each other with reference to the position of the antenna 102 on the Earth.

In a particular implementation, the method 400 includes measuring a signal power associated with the first communication signal, where the first location is determined based on the signal power. For example, the amplitude profile of each cell is not uniform, thus, communications received from the center of each cell are at a higher signal power than communications received from the outer edges of the cell. Based on the signal power, a location within a cell is determined by the processor 106.

The method 400 enables an antenna to perform concurrent communications with multiple spacecraft. Additionally, the method 400 enables design and use of smaller spacecraft compared to other satellite systems. For example, because most of the communications are performed by the ground-based antenna, the communication circuitry that is included on-board the spacecraft can be smaller and use less power than communication circuitry on-board conventional satellites. Another benefit of the method 400 is reduced cost and complexity of the ground-based antenna. For example, the antenna that performs operations described by the method 400 does not require gimbals, motors, or other components to change an orientation of the antenna to enable finding and tracking of spacecraft across the sky. Additionally, in some implementations, the method 400 enables identification of spacecraft without the spacecraft transmitting identification information that identifies the spacecraft as particular spacecraft with every message. Because spacecraft are not required to transmit this identifying information with each message, the size of messages may be decreased or the amount of payload in messages may be increased, thereby reducing network congestion and/or improving overall throughput of messages communicated between an antenna and multiple spacecraft.

In some implementations, the method 400 is performed by a processor executing computer readable instructions. For example, a computer readable storage device stores instructions that, when executed by a processor, cause the processor to perform operations including initiating generation of a plurality of signal beams at an antenna of a ground station. The plurality of signal beams defines a plurality of cells in the sky. The antenna is mechanically fixed to a particular orientation, and the antenna includes a phased array antenna. The operations further include initiating concurrent communications with a plurality of spacecraft via the plurality of signal beams. The plurality of spacecraft is located within the plurality of cells. In a particular implementation, the operations further include determining an estimated path of a first spacecraft of the plurality of spacecraft based on a subset of cells of the plurality of cells that are traversed by the first spacecraft, comparing the estimated path to spacecraft orbital data, and identifying the first spacecraft based on matching the estimated path to one of the orbital paths indicated by the spacecraft orbital data.

Although one or more of FIGS. 1-4 illustrate systems, apparatuses, and/or methods according to the teachings of the disclosure, the disclosure is not limited to these illustrated systems, apparatuses, and/or methods. One or more functions or components of any of FIGS. 1-4 as illustrated or described herein can be combined with one or more other portions of another of FIGS. 1-4. For example, one or more elements of the method 400 of FIG. 4 can be performed in combination with other operations described herein. Accordingly, no single implementation described herein should be construed as limiting and implementations of the disclosure can be suitably combined without departing form the teachings of the disclosure. As an example, one or more operations described with reference to FIG. 4 can be optional, can be performed at least partially concurrently, and/or can be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

What is claimed is:

1. A system comprising:
an antenna of a ground station, the antenna configured to generate a plurality of signal beams, the plurality of signal beams defining a plurality of cells in the sky, wherein the antenna is mechanically fixed to a particular orientation, and wherein the antenna comprises a phased array antenna; and
a processor coupled to the antenna, the processor configured to:
initiate concurrent communications with a plurality of spacecraft via the plurality of signal beams, the plurality of spacecraft located within the plurality of cells;
receive, via the antenna, a first communication signal from a first spacecraft of the plurality of spacecraft, the first communication signal received via a first signal beam of the plurality of signal beams;
determine a first location of the first spacecraft with respect to the plurality of cells based on receipt of the first communication signal;
receive, via the antenna, a second communication signal from the first spacecraft, the second communication signal received via a second signal beam of the plurality of signal beams;
determine a second location of the first spacecraft with respect to the plurality of cells based on receipt of the second communication signal; and
determine an estimated path of the first spacecraft based at least in part on the first location and the second location.

2. The system of claim 1, wherein the plurality of signal beams comprises a plurality of transmit signal beams, a plurality of receive signal beams, or a combination thereof.

3. The system of claim 1, wherein the antenna comprises a plurality of antenna elements, and wherein each antenna element of the plurality of antenna elements is fixed to a corresponding orientation.

4. The system of claim 1, wherein the antenna is further configured to receive communication signals from the plurality of spacecraft, and wherein the communication signals do not include identification information associated with the plurality of spacecraft.

5. The system of claim 1, wherein each spacecraft of the plurality of spacecraft moves with respect to one or more fixed positions on the Earth.

6. The system of claim 5, wherein the plurality of spacecraft includes one or more spacecraft traveling in low earth orbit (LEO), one or more spacecraft traveling in medium earth orbit (MEO), one or more spacecraft traveling in high earth orbit (HEO), or a combination thereof.

7. The system of claim 1, wherein the plurality of spacecraft includes one or more spacecraft traveling in or near geostationary orbit.

8. The system of claim 1, further comprising a memory configured to store spacecraft orbit data, the spacecraft orbit data indicating orbital paths of the plurality of spacecraft, wherein the processor is further configured to:
determine whether the estimated path matches an orbital path identified by the spacecraft orbit data; and
responsive to determining that the estimated path matches a particular orbital path of a particular spacecraft, identify the first spacecraft as the particular spacecraft.

9. A method comprising:
generating a plurality of signal beams at an antenna of a ground station, the plurality of signal beams defining a plurality of cells in the sky, wherein the antenna is mechanically fixed to a particular orientation, and wherein the antenna comprises a phased array antenna; and
performing concurrent communications with a plurality of spacecraft via the plurality of signal beams, the plurality of spacecraft located within the plurality of cells,
wherein performing the concurrent communications comprises:
receiving, via the antenna, a first communication signal from a first spacecraft of the plurality of spacecraft, the first communication signal received via a first signal beam of the plurality of signal beams;
determining a first location of the first spacecraft with respect to the plurality of cells based on receipt of the first communication signal;
receiving, via the antenna, a second communication signal from the first spacecraft, the second communication signal received via a second signal beam of the plurality of signal beams;
determining a second location of the first spacecraft with respect to the plurality of cells based on receipt of the second communication signal; and
determining an estimated path of the first spacecraft based at least in part on the first location and the second location.

10. The method of claim 9, further comprising:
determining whether the estimated path matches an orbital path identified by spacecraft orbit data stored at a memory; and
responsive to determining that the estimated path matches a particular orbital path of a particular spacecraft, identifying the first spacecraft as the particular spacecraft.

11. The method of claim 10, further comprising responsive to identifying the first spacecraft as the particular spacecraft, initiating transmission of particular data associated with the particular spacecraft to the first spacecraft via one or more of the plurality of signal beams.

12. The method of claim 10, further comprising estimating a future location of the first spacecraft based on the particular orbital path.

13. The method of claim 10, further comprising:
receiving, via the antenna, a third communication signal from a second spacecraft of the plurality of spacecraft, the third communication signal received via a third signal beam of the plurality of signal beams;
determining a third location of the second spacecraft with respect to the plurality of cells based on receipt of the third communication signal;

receiving, via the antenna, a fourth communication signal from the second spacecraft, the fourth communication signal received via the second signal beam;

determining a fourth location of the second spacecraft with respect to the plurality of cells based on receipt of the fourth communication signal; and determining an estimated path of the second spacecraft based at least in part on the third location and the fourth location.

14. The method of claim 13, wherein the first spacecraft and the second spacecraft are located within 1 degree of each other, at a particular time, with respect to a position on the Earth, and wherein the concurrent communications are performed at the particular time.

15. The method of claim 9, further comprising measuring a signal power associated with the first communication signal, wherein the first location is determined based on the signal power.

16. A computer-readable storage device storing instructions that, when executed by a processor, cause the processor to perform operations comprising:

initiating generation of a plurality of signal beams at an antenna of a ground station, the plurality of signal beams defining a plurality of cells in the sky, wherein the antenna is mechanically fixed to a particular orientation, and wherein the antenna comprises a phased array antenna;

initiating concurrent communications with a plurality of spacecraft via the plurality of signal beams, the plurality of spacecraft located within the plurality of cells;

determining an estimated path of a first spacecraft of the plurality of spacecraft based on a subset of cells of the plurality of cells that are traversed by the first spacecraft;

comparing the estimated path to spacecraft orbit data, the spacecraft orbit data indicating orbital paths of one or more spacecraft; and identifying the first spacecraft based on matching the estimated path to one of the orbital paths indicated by the spacecraft orbit data.

17. The computer-readable storage device of claim 16, wherein the concurrent communications are initiated without performing a scanning operation to determine locations of the plurality of spacecraft.

* * * * *